US010429954B2

(12) United States Patent
Markiewicz et al.

(10) Patent No.: US 10,429,954 B2
(45) Date of Patent: Oct. 1, 2019

(54) MULTI-STROKE SMART INK GESTURE LANGUAGE

(71) Applicant: Microsoft Technology Licensing, LLC, Redmond, WA (US)

(72) Inventors: Jan-Kristian Markiewicz, Redmond, WA (US); Robert Joseph Disano, Seattle, WA (US); Christian Klein, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 122 days.

(21) Appl. No.: 15/609,980

(22) Filed: May 31, 2017

(65) Prior Publication Data
US 2018/0348896 A1    Dec. 6, 2018

(51) Int. Cl.
*G06F 3/041* (2006.01)
*G09G 3/36* (2006.01)
(Continued)

(52) U.S. Cl.
CPC ...... *G06F 3/03545* (2013.01); *G06F 3/04812* (2013.01); *G06F 3/04842* (2013.01); *G06F 3/04847* (2013.01); *G06F 3/04883* (2013.01); *G06K 9/00416* (2013.01); *G06K 9/00422* (2013.01)

(58) Field of Classification Search
CPC ............... G06F 3/0488; G06F 3/03545; G06F 3/04812; G06F 3/04842; G06F 3/04847; G06F 3/04883; G06K 9/00416; G06K 9/00422
See application file for complete search history.

(56) References Cited

U.S. PATENT DOCUMENTS 5,760,773 A    6/1998    Berman et al.
8,643,615 B2   2/2014    Adamson et al.
(Continued)

FOREIGN PATENT DOCUMENTS

EP    1703364 A2    9/2006

OTHER PUBLICATIONS

Hinckley, et al., "Phrasing Techniques for Multi-Stroke Selection Gestures", In Proceedings of Graphics Interface, Jun. 7, 2006, 8 pages.
(Continued)

*Primary Examiner* — Nelson M Rosario

(57) ABSTRACT

This document describes techniques for, and systems that enable, a multi-stroke smart ink gesture language. The described techniques enable a digital ink user interface that allows a display, that is capable of receiving a digital ink stroke from a passive stylus or an active pen, to receive the digital ink stroke as either a content input or an action input. The digital ink stroke may be determined to be an action input based on proximity to, intersection with, or chronological immediacy to a prior-received digital ink stroke. When multiple digital ink strokes are determined to represent a multi-stroke gesture associated with an action input, the action input is provided to the application, which can then perform the action associated with the action input. The multi-stroke gesture allows users to input both content and actions using the passive stylus or active pen and natural digital inking strokes.

20 Claims, 11 Drawing Sheets

(51) Int. Cl.
*G06F 3/0354* (2013.01)
*G06F 3/0484* (2013.01)
*G06F 3/0481* (2013.01)
*G06F 3/0488* (2013.01)
*G06K 9/00* (2006.01)

(56) References Cited

U.S. PATENT DOCUMENTS

| | | |
|---|---|---|
| 9,411,498 B2 | 8/2016 | Hinckley et al. |
| 2002/0149630 A1 | 10/2002 | Kitainik et al. |
| 2005/0229117 A1 | 10/2005 | Hullender et al. |
| 2006/0061780 A1* | 3/2006 | Chen .................... G06F 3/0488 358/1.8 |
| 2008/0232690 A1 | 9/2008 | Saund et al. |
| 2011/0173574 A1 | 7/2011 | Clavin et al. |
| 2011/0307535 A1* | 12/2011 | Vukosavljevic .... G06F 3/04883 708/142 |
| 2011/0307840 A1 | 12/2011 | Harris et al. |
| 2013/0307861 A1* | 11/2013 | Lang .................. G06F 3/04883 345/582 |
| 2014/0298272 A1 | 10/2014 | Doan et al. |
| 2016/0048318 A1 | 2/2016 | Markiewicz |

OTHER PUBLICATIONS

"International Search Report And Written Opinion issued In PCT Application No. PCT/US18/029677", dated Jul. 23, 2018, 12 pages.

\* cited by examiner

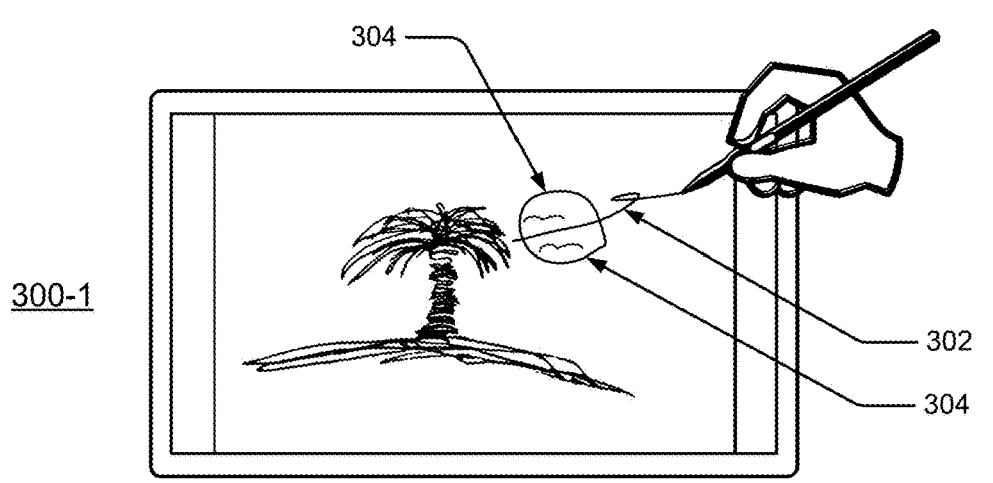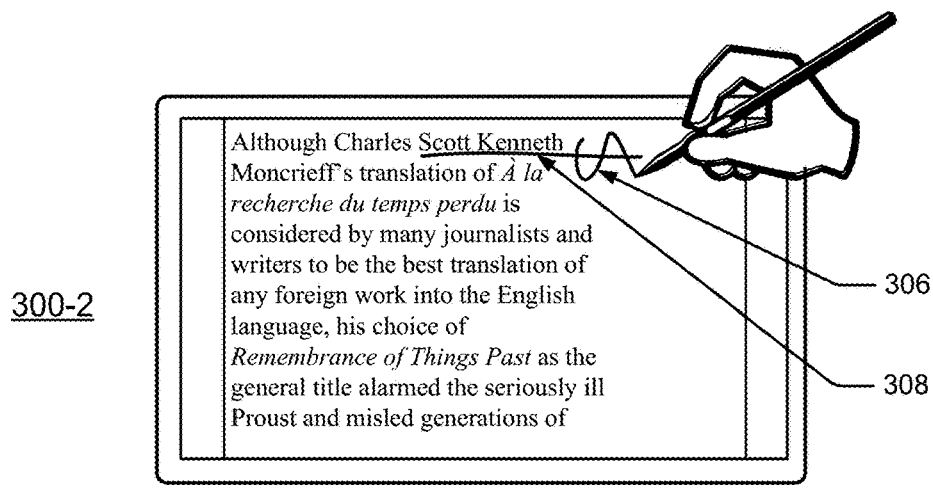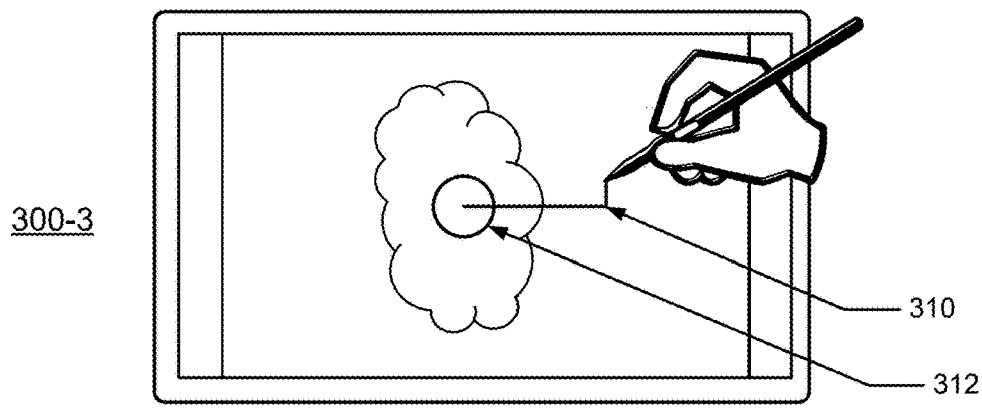
Fig. 3

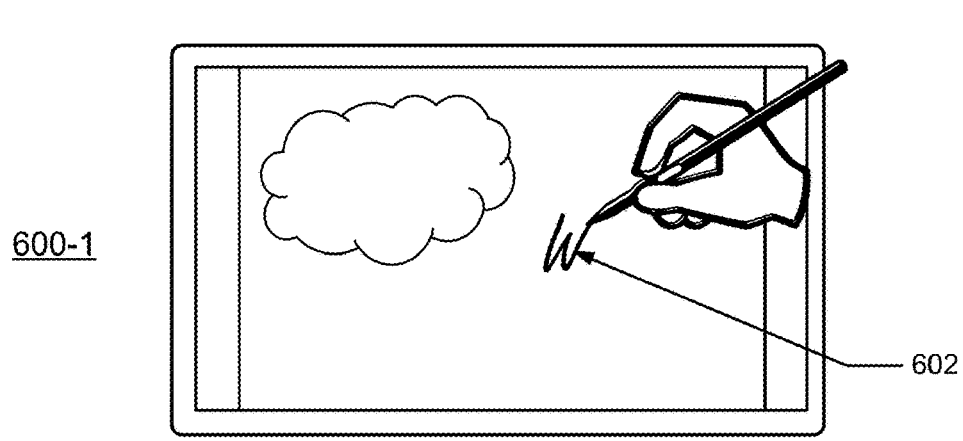
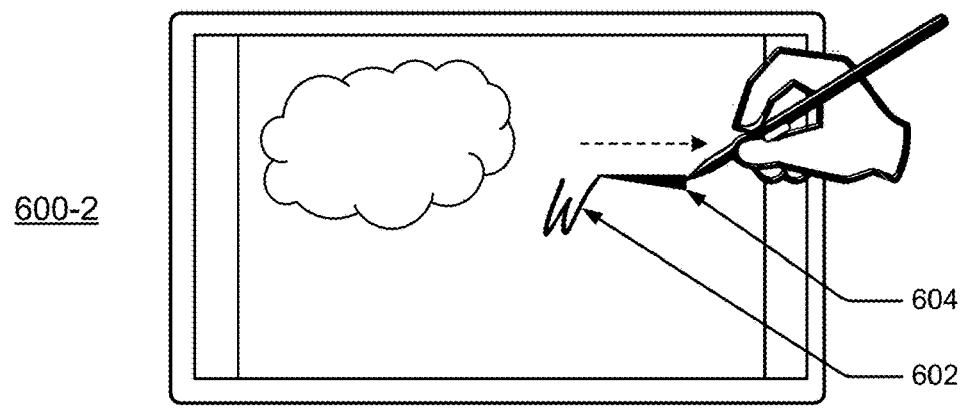
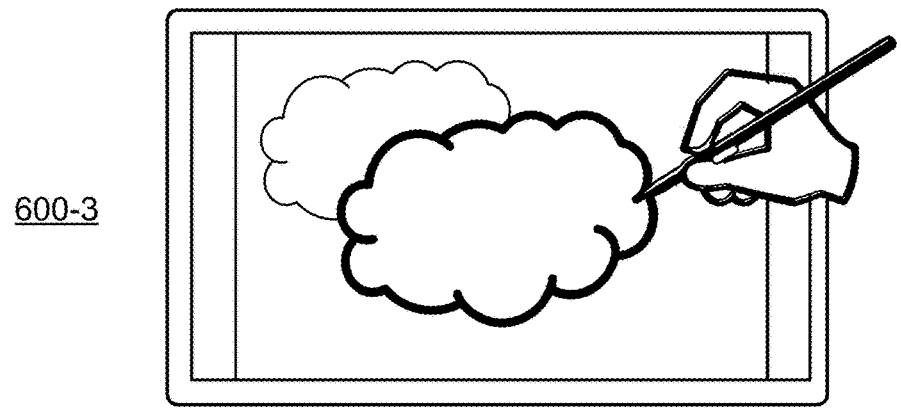
Fig. 6

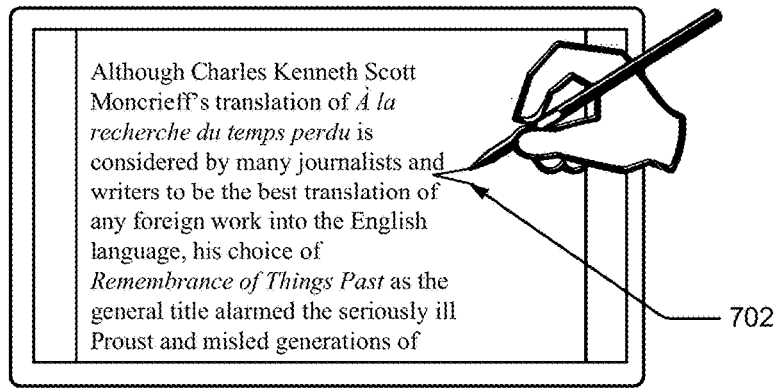
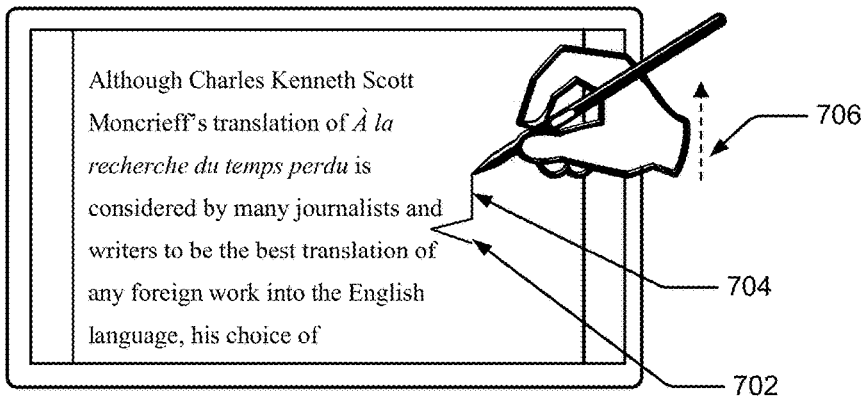
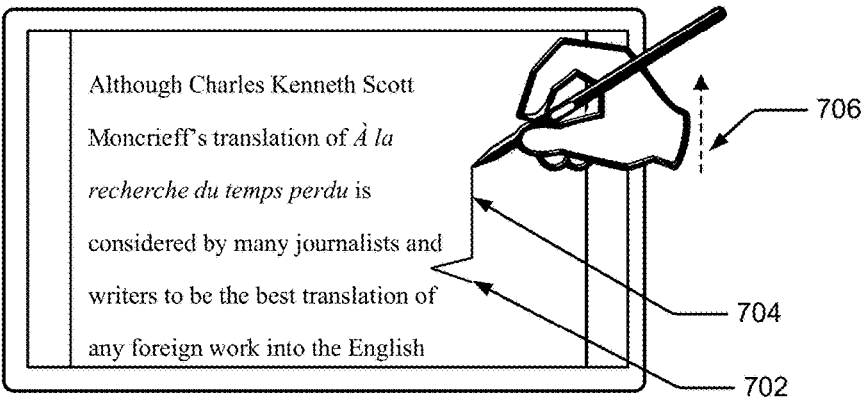
Fig. 7

800

Receive a Digital Ink Stroke Made Through a Stylus, the Digital Ink Stroke Received Through a Display That is Capable of Receiving Input from the Stylus and Over a Digital Ink User Interface Associated with an Application and Configured to Receive the Digital Ink Stroke and Present, in Real Time, a Visual Representation of the Digital Ink Stroke.
802

Determining, Based on a Proximity to, Intersection With, or Chronological Immediacy to a Prior-Received Digital Ink Stroke Currently Presented in or Over the Digital Ink User Interface, that the Digital Ink Stroke and the Prior-Received Digital Ink Stroke Represent a Multi-Stroke Gesture Associated with an Action Input.
804

Comparing an Initial Gesture Determination with a Set of Action Inputs Associated with the Application.
806

Providing the Action Input to the Application Effective to Cause the Application to Receive and React to the Action Input.
808

Receive a First Digital Ink Stroke Made Through a Stylus, the First Digital Ink Stroke Received Through a Display That is Capable of Receiving Input from the Stylus and Over a Digital Ink User Interface Associated with an Application.

902

↓

Present, Over the Digital Ink User Interface and in Real Time, a First Visual Representation of the First Digital Ink Stroke.

904

↓

Receive, While the First Visual Representation of the First Digital Ink Stroke is Visually Maintained, a Second Digital Ink Stroke Made Through the Stylus and Received over the Digital Ink User Interface.

```
┌─────────────────────────────────────────────┐
│ Present, Over the Digital Ink User Interface│
│ and in Real Time, a Second Visual           │
│ Representation of the Second Digital Ink    │
│ Stroke while Visually Maintaining the First │
│ Visual Representation.                      │
│                    908                      │
└─────────────────────────────────────────────┘
                      │
                      ▼
┌─────────────────────────────────────────────┐
│ Determine, Based on a Location of the First │
│ Digital Ink Stroke Represented by the First │
│ Visual Representation or a Relationship     │
│ Between the First Digital Ink Stroke and    │
│ the Second Digital Ink Stroke, That the     │
│ First and Second Digital Ink Strokes        │
│ Represent a Multi-Stroke Gesture Associated │
│ with an Action Input.                       │
│                    910                      │
└─────────────────────────────────────────────┘
                      │
                      ▼
┌─────────────────────────────────────────────┐
│ Provide the Action Input to the Application │
│ Associated With A Command User Interface    │
│ Effective to Cause the Application to       │
│ Receive and React to the Action Input.      │
│                    912                      │
└─────────────────────────────────────────────┘
```

Fig. 9B

MULTI-STROKE SMART INK GESTURE LANGUAGE

BACKGROUND

This background provides context for the disclosure. Unless otherwise indicated, material described in this section is not prior art to the claims in this disclosure and is not admitted to be prior art by inclusion in this section.

Digital inking technology enables a device display to digitally represent strokes from a stylus or an active pen in a natural form on the display, analogous to writing with liquid ink on paper. The resulting visual representations may be saved as searchable text and images or, in the case of handwriting, may be converted to typed text. As mobile devices become more powerful and can be used for drawing, sketching, writing, editing, and other creative applications, this technology has become more common. Digital inking allows users to use their own natural movements to captures sketches, handwriting, diagrams, and other content on their devices. Even in applications and environments that are primarily pen-centric, such as drafting and note-taking, existing digital ink user interfaces require users to switch from using an active pen for digital inking to using the active pen for touchscreen interaction or to switch from a stylus or active pen to a different input method. For example, users may have to either perform a sequence of pen interactions with an onscreen command user interface or switch to a touchscreen mode to perform navigation and command tasks. These approaches are often cumbersome to use and take users out of their natural flow of using the pen for making ink strokes.

SUMMARY

This document describes techniques for, and systems that enable, a multi-stroke smart ink gesture language. The multi-stroke gesture provides a way for users to employ simple, natural gestures, in a digital ink context, both for creating content and for performing actions. In this way, users do not have to slow down or switch input modes while using and controlling their device. The described techniques enable a digital ink user interface. The digital ink user interface allows a display that is capable of receiving digital ink strokes from a passive stylus or an active pen to receive the digital ink stroke as either a content input or an action input. The digital ink stroke may be determined to be an action input based on proximity to, intersection with, or chronological immediacy to a prior-received digital ink stroke. When multiple digital ink strokes (the digital ink stroke and the prior-received digital ink stroke) are determined to represent a multi-stroke gesture associated with an action input, the action input is provided to the application, which can then perform the action associated with the action input. The multi-stroke gesture allows users to input both content and actions using the passive stylus or active pen and natural digital inking strokes.

This summary is provided to introduce simplified concepts related to a multi-stroke smart ink gesture language, which are further described below in the Detailed Description. This summary is not intended to identify essential features of the claimed subject matter, nor is it intended for use in determining the scope of the claimed subject matter.

BRIEF DESCRIPTION OF THE DRAWINGS

Apparatuses and techniques using a multi-stroke smart ink gesture language are described with reference to the following drawings. The same elements may be shown in different orientations in different figures to provide additional detail or clarity. The same numbers are used throughout the drawings to reference like features and components:

FIGS. 2-4 illustrate example techniques for making the multi-stroke gestures of FIG. 1.

FIGS. 5-7 illustrate example implementations of the action input concept of FIG. 1.

FIG. 8 illustrates an example method enabling or using the multi-stroke smart ink gesture language in accordance with one or more aspects.

FIG. 9A illustrates another example method enabling or using the multi-stroke smart ink gesture language in accordance with one or more aspects.

FIG. 9B illustrates additional steps of the example method illustrated in FIG. 9A.

DETAILED DESCRIPTION

Overview

Figure 1:
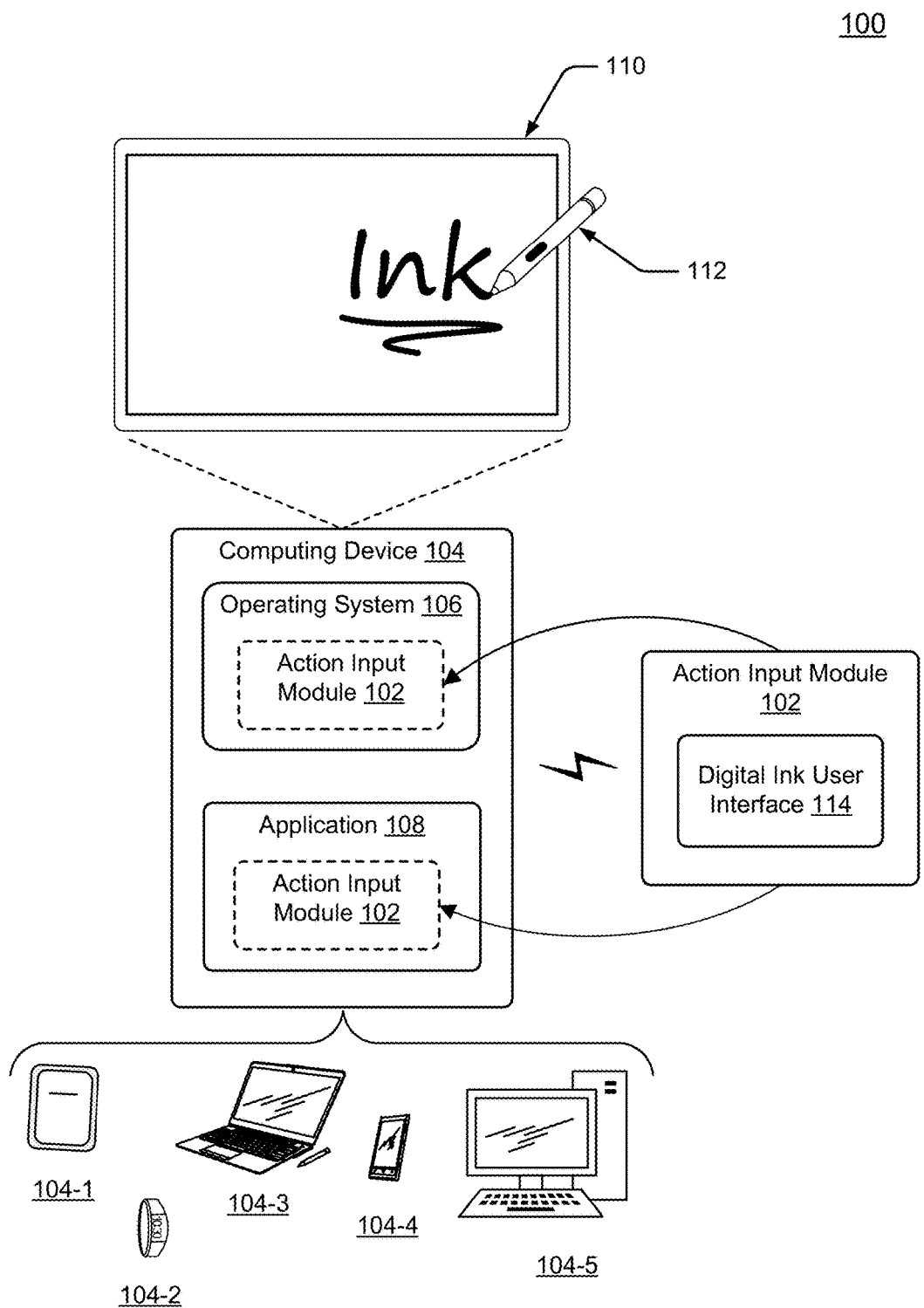
FIG. 1 illustrates an example system in which a multi-stroke smart ink gesture language can be implemented.

This document describes techniques using, and systems enabling, a multi-stroke smart ink gesture language. Through use of these techniques and systems, stylus and active pen users can create content and perform actions on their devices using natural digital ink strokes. By remaining in a digital inking flow to perform these command and navigation actions, the actions can be done without slowing down, requiring non-stylus input methods, or requiring users to use the stylus or active pen for non-inking interactions with a touchscreen user interface.

By way of example, consider a situation in which a person is using an active pen to draw a sunset. While drawing, the person may want to change the properties of the digital ink, like color or line width. Additionally, the person may want to change what has already been drawn by deleting details or copying an item or section to another part of the drawing. Current methods for these operations are typically slow to use, and require either non-pen input methods (e.g., touching or typing), or require using the active pen for non-inking interactions that take the user out of the inking mode (e.g., using the active pen as a stylus for touch interactions).

Contrast these existing techniques with the techniques and systems for a multi-stroke smart ink gesture language described in this document. The described techniques are natural, require no mode-switching between inking and touchscreen behavior, and allow the person to maintain a consistent use of the stylus or active pen. Returning to the above example, consider the case in which the person wants to change the width of the line the active pen makes. Rather than lifting the active pen, finding a menu, tapping the line width command, and selecting a new width, the multi-stroke smart ink gesture language techniques allow the user to simply make a digital ink stroke (e.g., a "W" shape) followed by another digital ink stroke (e.g., a line attached to a leg of the "W" shape and moving to the left or right). As the second digital ink stroke progresses to the left or right, the line width decreases or increases until the user has the desired line width. The user then lifts the active pen and the two digital ink strokes disappear, leaving the user to continue drawing with the new line width. The user has achieved the desired result while remaining in a creative and natural digital inking mode and without having to access a menu or command screen.

This is merely one example of how the techniques and devices enable the multi-stroke smart ink gesture language. Other examples are described below. This document now turns to an example system, after which example methods and systems are described.

Example System

FIG. 1 illustrates an example system 100 in which a multi-stroke smart ink gesture language can be implemented. The example system 100 illustrates an action input module 102, a computing device 104, an operating system (OS) 106, and an application 108. The discussion turns first to the computing device 104 and associated elements, and the action input module 102 is then described in further detail.

The computing device 104 can be one or a combination of various devices that include a display 110. The display 110 is capable of receiving a digital ink stroke from a stylus 112. The display 110 may also be capable of receiving touch input. The display 110 can use any of a variety of technologies for presenting digital ink. For example, a digitizer can be layered with a liquid crystal display (LCD) screen to create a display that can capture the stroke of the stylus 112 and create a visual representation of the stroke on the LCD screen, analogous to writing with liquid ink on paper. The visual representation of a digital ink stroke can be a free-form line matching a free-form movement of an active point of the stylus 112. The resulting visual representations may be saved as searchable text and images or, in the case of handwriting, may be converted to typed text. The computing device 104 is illustrated in FIG. 1 with five examples: a tablet computer 104-1, a computing watch 104-2, a laptop 104-3, a smartphone 104-4, and a desktop computer 104-5, though other computing devices and systems may also be used.

The stylus 112 can be a passive or active stylus. For clarity, the term "stylus" will be used to refer generally to either a passive or an active stylus, and the term "active pen" will be used to refer to an active stylus. Generally, a stylus is a handheld instrument that can be used to interact with a touchscreen. An active stylus, also known as an active pen, is capable of active communication with a display such as the display 110. Active communication allows an active pen to provide information to the digitizer. For example, the digitizer can determine the location of the active pen on, or just above, the screen and measure the pressure exerted by the active pen. An active pen may also include other functionality, such as a digital eraser.

Active communication may be via a wired or wireless connection. A wireless active pen may use any of a variety of short range wireless protocols to communicate with the digitizer and display. For example, an active pen may communicate via an electrostatic interface, a Bluetooth connection, or an Infrared Data Association (IrDA) protocol. In contrast, a passive stylus operates like a finger on a touchscreen and does not actively communicate with the touchscreen. In implementations of the multi-stroke smart ink gesture language in which the stylus 112 is a passive stylus, the display 110 may provide a control (e.g., through the OS 106 or the application 108) that can be selected to tell the digitizer to accept input from the stylus 112 as input from an active pen rather than merely as input from a finger. Other implementations may use different methods for distinguishing between touch input from a finger and digital ink input from a passive stylus. For example, the action input module 102, the OS 106 and/or the application 108 may analyze the size and shape of the contact area on the touchscreen in order to determine the input mode.

The OS 106 can be any of a variety of mobile or desktop operating systems that manage software and hardware resources and/or provide services for applications running on the OS. For example, the OS 106 may be Microsoft Windows, macOS, Linux, Android, or iOS. The application 108 can be any of a variety of computer application programs that can receive, display, and use a digital ink stroke from the stylus 112. For example, the application 108 may be a word processing or note-taking program, a spreadsheet program, a drafting or drawing program, a photo-editing program, or an animation program.

The action input module 102 includes a digital ink user interface 114. As shown in FIG. 1, the action input module 102 (and the digital ink user interface 114) may be implemented in the OS 106, in the application 108, or as a separate module such as a standalone cloud-based module or a subscription add-on service. Further, because the OS 106 and/or the application 108 may be hosted by the computing device 104, the blocks that represent the OS 106 the application 108 are depicted within the block that represents computing device 104. In some implementations, however, either or both of the OS 106 and the application 108 may be a standalone module, such as cloud- or internet-based system or application.

The action input module 102 may present the digital ink user interface 114 via the OS 106 or the application 108. The digital ink user interface 114 can receive the digital ink stroke made through the stylus 112. The digital ink stroke is received through a display that is capable of receiving input from the stylus 112 (e.g., display 110) and received over the digital ink user interface 114. The digital ink user interface 114 can receive the digital ink stroke and present, in real time, a visual representation of the digital ink stroke. The digital ink user interface 114 may be associated with an application (e.g., the application 108). Association with the application may allow the digital ink user interface 114 to interact with the application in a variety of ways. For example, the digital ink user interface 114 may receive and display content input for the application and/or receive and perform action input for the application, control and/or be controlled by various functionality of the application, communicate with and/or through the application, and so forth. Thus, via the association of the digital ink user interface 114 with the application, the digital ink stroke may be received over the digital ink user interface 114 and over a user interface of the application. In some cases, the digital ink user interface 114 is provided by the OS 106 in conjunction with the application 108, and the OS 106 can perform the steps performed by the action input module 102, including presenting the visual representation of the digital ink stroke.

Content input is input in which the visual representation of the digital ink stroke, produced by the movement of the stylus 112, is the input. For example, content input can be text or a drawing. An action input, in contrast, is not content. An action input is also produced by movement of the stylus 112, but the visual representation of the digital ink stroke is not itself the input. Rather, an action input is an input that results in performance of an action such as a command, a selection of an operation or visual entity, or an adjustment to a property or setting. The action input is described with additional details and examples below.

The action input module 102 can determine, based on a relationship between two or more digital ink strokes, that the two or more digital ink strokes represent an action input. For example, based on proximity to, intersection with, or chronological immediacy to a prior-received digital ink stroke currently presented in or over the digital ink user interface 114, the action input module 102 can determine that a digital ink stroke and the prior-received digital ink stroke represent a multi-stroke gesture associated with an action input. In some implementations, the determination that the digital ink stroke and the prior-received digital ink stroke represent a multi-stroke gesture may be made using a combination of two or more of proximity, intersection, and chronological immediacy. The action input module 102 can then provide the action input to the application 108, which receives the action input and reacts by performing the action defined by the action input.

Figure 2:
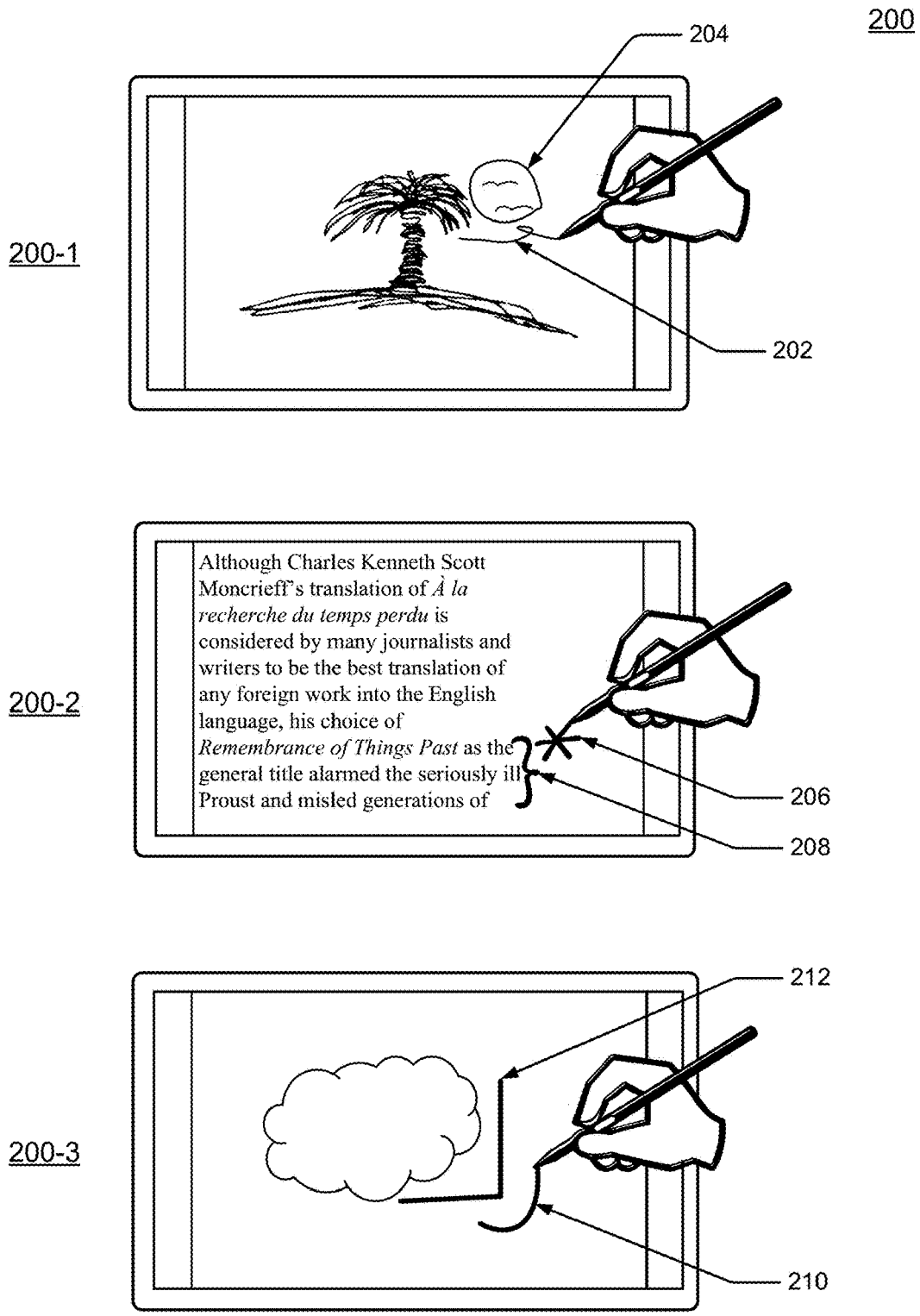
Figure 4:
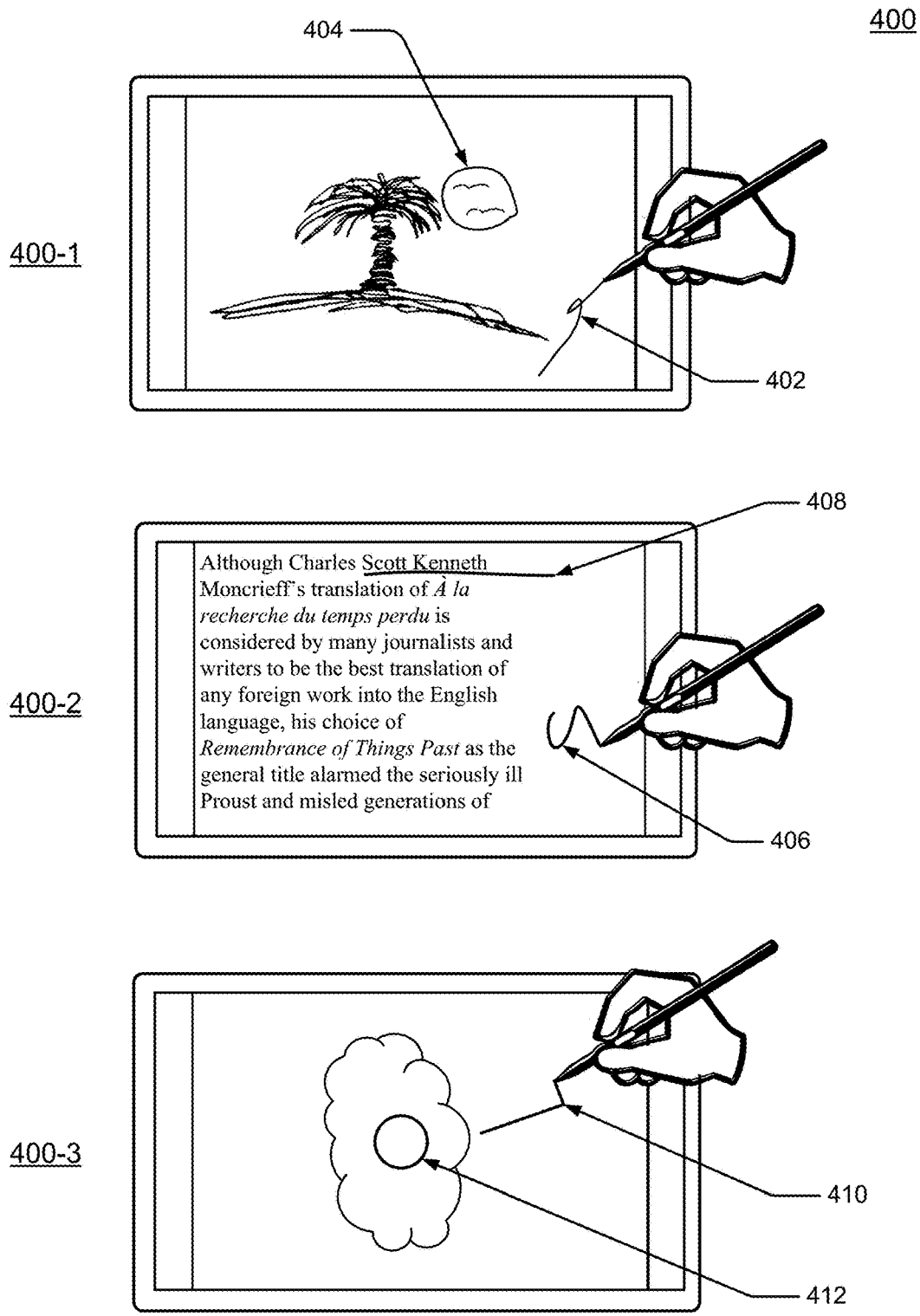

FIGS. 2-4 illustrate example techniques 200, 300, and 400 for making the multi-stroke gestures of FIG. 1. In FIG. 2, the action input module 102 determines that a digital ink stroke and a prior-received digital ink stroke represent a multi-stroke gesture based on the proximity of the digital ink stroke to the prior-received digital ink stroke. Example 200-1 shows a digital ink stroke 202 and a prior-received digital ink stroke 204. The digital ink stroke 202 is within a threshold proximity of the prior-received digital ink stroke 204. The action input module 102 can thereby determine that the digital ink stroke 202 and the prior-received digital ink stroke 204 represent a multi-stroke gesture associated with an action input, here a command to delete the two birds.

Examples 200-2 and 200-3 depict other multi-stroke gestures associated with action inputs. In example 200-2, a digital ink stroke 206 and a prior-received digital ink stroke 208 indicate a command to perform an operation on a selected passage in the text (e.g., highlight the selected passage). Similarly, in example 200-3, a digital ink stroke 210 and a prior-received digital ink stroke 212 indicate a command to perform an operation on an object in the drawing (e.g., rotate the cloud counter-clockwise). Again, in both examples, the digital ink strokes 206 and 210 are within a threshold proximity of the prior-received digital ink strokes 208 and 212, respectively.

The threshold proximity may be any of a variety of values. For example, the threshold may be an absolute distance (measured, for example, in millimeters or pixels) or a relative distance (measured, for example, as a percentage of the width of the digital ink stroke or as a percentage of the width or height of the display). In some cases, the threshold may be predetermined by, for example, the action input module 102, the OS 106, or the application 108. In other cases, the predetermined threshold may be adjustable (e.g., via a particular multi-stroke gesture, the action input module 102, the OS 106, or the application 108).

In each example 200-1, 200-2, and 200-3, the prior-received digital ink stroke (204, 208, and 212) remains visible on the display and the current digital ink stroke (202, 206, and 210) is shown in real time, which allows an action input to be made using simple and easy strokes that can be made with high accuracy. Further, because the action input module 102 can determine that the digital ink strokes are a multi-stroke gesture, the digital ink stroke and the prior-received digital ink stroke can be presented in transient digital ink. Transient digital ink is automatically dismissed once a multi-stroke digital ink gesture is recognized and the associated input action is determined. The transient digital ink may be visually styled in a manner that allows it to be distinguished from content input. For example, the transient ink may be a different color or include an animation (e.g., sparkling or fading in and out). The use of transient digital ink, rendered as an overlay via a digital ink user interface such as digital ink user interface 114, makes multi-stroke digital ink gestures available in typically non-ink contexts like navigation screens and command menus.

In FIG. 3, the action input module 102 determines that a digital ink stroke and a prior-received digital ink stroke represent a multi-stroke gesture based on one or more intersections of the digital ink stroke with the visual representation of the prior-received digital ink stroke. Example 300-1 shows a digital ink stroke 302 and a prior-received digital ink stroke 304. The digital ink stroke 302 intersects the prior-received digital ink stroke 304 twice. The action input module 102 can thereby determine that the digital ink stroke 302 and the prior-received digital ink stroke 304 represent a multi-stroke gesture associated with an action input, here a command to delete the two birds.

Examples 300-2 and 300-3 depict other multi-stroke gestures associated with action inputs. In example 300-2, a digital ink stroke 306 and a prior-received digital ink stroke 308 indicate a command to perform an operation on a selected passage in the text (e.g., to switch the order of the two underlined words). Similarly, in example 300-3, a digital ink stroke 310 and a prior-received digital ink stroke 312 indicate a command to perform an operation on an object in the drawing (e.g., rotate the cloud counter-clockwise). Again, in both examples, the digital ink strokes 306 and 310 are made to intersect the prior-received digital ink strokes 308 and 312, respectively.

As noted, because the action input module 102 can determine that the digital ink strokes are a multi-stroke gesture, the example digital ink stroke (302, 306, and 310) and the prior-received digital ink stroke (304, 308, and 312) can be presented in transient digital ink. The transient digital ink enables advanced gestures, such as those illustrated in examples 300-1, 300-2, and 300-3. For example, because the prior-received digital ink stroke (304, 308, and 312) remains visible until the multi-stroke digital ink gesture is recognized and interpreted, the digital ink stroke (302, 306, and 310) can include multiple intersections or have a particular shape or location relative to the prior-received digital ink stroke. Advanced gestures like those described in FIG. 3 would not be possible unless both the digital ink stroke and the prior-received digital ink stroke are simultaneously visible.

In FIG. 4, the action input module 102 determines that a digital ink stroke and a prior-received digital ink stroke represent a multi-stroke gesture based on the chronological immediacy of the digital ink stroke to reception of the prior-received digital ink stroke. Example 400-1 shows a digital ink stroke 402 and a prior-received digital ink stroke 404. The digital ink stroke 402 is within a threshold time duration of the prior-received digital ink stroke 404. The action input module 102 can thereby determine that the digital ink stroke 402 and the prior-received digital ink stroke 404 represent a multi-stroke gesture associated with an action input, here a command to delete the two birds.

Examples 400-2 and 400-3 depict other multi-stroke gestures associated with action inputs. In example 400-2, a digital ink stroke 406 and a prior-received digital ink stroke 408 indicate a command to perform an operation on a selected passage in the text (e.g., to switch the order of the two underlined words). Similarly, in example 400-3, a digital ink stroke 410 and a prior-received digital ink stroke 412 indicate a command to perform an operation on an object in the drawing (e.g., rotate the cloud counter-clockwise). Again, in both examples, the digital ink strokes 406 and 410 are within a threshold time duration of the prior-received digital ink strokes 408 and 412, respectively.

The threshold time duration may be any of a variety of values. For example, half of a second, one second, or 2 seconds. In implementations in which the action input module 102 can determine that the first digital ink stroke (e.g., the prior-received digital ink strokes 404, 408, and 412) is likely to be part of a multi-stroke gesture, the visual style of the transient digital ink, described above, can be applied before the second digital ink stroke (e.g., the digital ink strokes 402, 406, and 410) is made. If no second digital ink stroke is made, the first digital ink stroke can become content input or be dismissed as a failed action input. As described with reference to FIG. 2, the threshold may be predetermined or adjustable.

In some cases, the value of the threshold time duration is a relative value rather than an absolute value. For example, the duration threshold may be determined based on an amount of time taken to draw the first digital ink stroke so that the duration within which the second digital ink stroke is made is proportional to the time elapsed to make the first digital ink stroke. Additionally or alternatively, the length or complexity of available valid second digital ink strokes (based on the first digital ink stroke) may be used to adjust the threshold time duration. Further, combinations of absolute and relative durations may be used. For example, an absolute duration (e.g., half of a second) may be applied in combination with a relative duration so that the determination is quickly made for most multi-stroke gestures, but longer or more complicated gestures will have a longer duration. In this way, users do not need to adjust their speed in order to generate simple or complex multi-stroke gestures.

The examples illustrated in FIGS. 2-4 show multi-stroke gestures with two digital ink strokes. As noted, the multi-stroke gesture may include more than two digital ink strokes. For example, determining that the digital ink stroke and the prior-received digital ink stroke represent a multi-stroke gesture may be further based on a second proximity to, second intersection with, or second chronological immediacy of a second prior-received digital ink stroke. In this case, the second prior-received digital ink stroke is received prior to the prior-received digital ink stroke.

As noted, the determination that the digital ink stroke and the prior-received digital ink stroke represent a multi-stroke gesture may be made using a combination of two or more of proximity, intersection, and chronological immediacy. While the first and second digital ink strokes shown in FIG. 3 include an intersection, the examples may also be used illustrate combinations. For example, in example 300-1, the digital ink stroke 302 intersects the prior-received digital ink stroke 304 twice. By using intersection in combination with immediacy, the action input module 102 may determine that the digital ink stroke 302 and the prior-received digital ink stroke 304 represent a multi-stroke gesture associated with an action input only if the intersection is performed within a threshold time duration, as described above. In this way, a content element that is similar to a multi-stroke gesture may be less likely to be erroneously interpreted as the multi-stroke gesture.

Likewise, while the examples in FIGS. 2 and 4 do not include an intersection, any of the examples may illustrate a combination of proximity and immediacy that can be used to further specify the way the first and second digital ink strokes may be determined to be multi-stroke gestures. For example, in example 400-2, the digital ink stroke 406 and the prior-received digital ink stroke 408 are relatively far apart (e.g., compared to the display size). Even so, by combining the proximity and immediacy techniques, the digital ink strokes may still be determined to indicate multi-stroke gesture if the digital ink stroke 406 is performed within a threshold time duration of the prior-received digital ink stroke 408.

Figure 5:
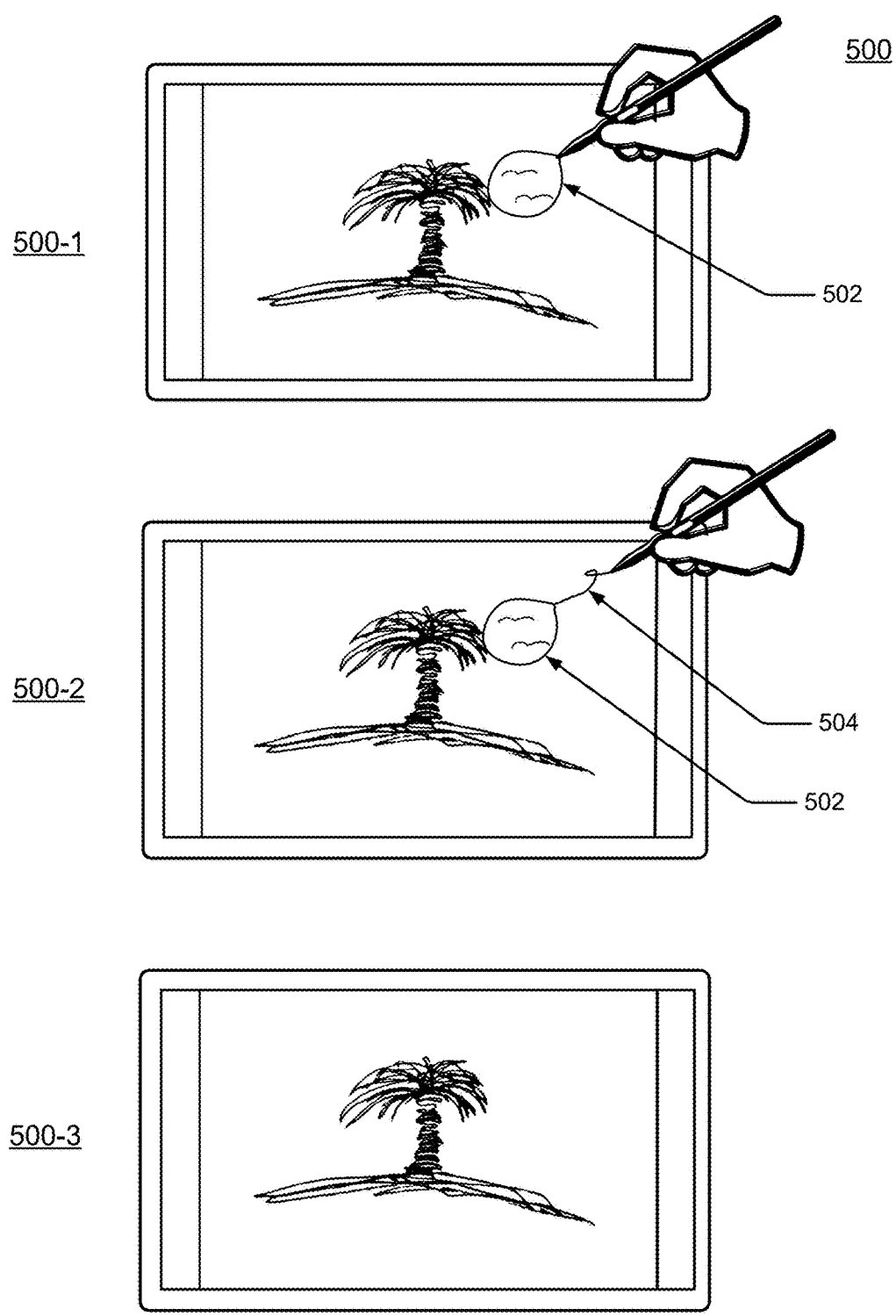

FIGS. 5-7 illustrate example implementations 500, 600, and 700 of the action input concept of FIG. 1. In FIG. 5, the example action input includes a digital ink stroke that defines a selection and another digital ink stroke that defines a command to be performed on the selection. For example, in detail view 500-1, a first digital ink stroke 502 defines the selection as the two birds in the image. In detail view 500-2, a second digital ink stroke 504 defines the command to be performed on the selection. Here, the command is to delete the selection, as shown in detail view 500-3. Note that by using transient digital ink, as described above, the first digital ink stroke 502 is still visible in detail view 500-2, where it aids in placing the second digital ink stroke 504. In detail view 500-3, however, the command has been performed, and neither the first digital ink stroke 502 nor the second digital ink stroke 504 are visible. In other cases, the defined selection may be a section of text and the defined command may be to save or copy the selection, change the formatting of the selection, or create a sticky note that contains the selection.

In FIG. 6, the example action input includes a digital ink stroke that defines a property and another digital ink stroke that adjusts the property in one or two dimensions. For example, in detail view 600-1, a first digital ink stroke 602 defines a property to be adjusted. In this example, a "W" shaped first ink stroke is used to specify that the width of the line made by the stylus is the property to adjust. In detail view 600-2, a second digital ink stroke 604 is then used to increase the width of the line. As shown in detail view 600-3, the line width has been increased. Further, because the first and second digital ink strokes 602 and 604 were made using transient digital ink, as described above, they have been dismissed. A width adjustment, as described in FIG. 6, is a one dimension adjustment. Other examples of one dimension adjustments include adjusting a font, a line style (e.g., a paint brush, an ink pen, or a charcoal pencil), or a number value. Examples of adjustments in two dimensions include adjusting a color (e.g., modifying the hue and saturation simultaneously) or adjusting a coordinate pair.

In FIG. 7, the example action input includes a digital ink stroke that defines a command and another digital ink stroke that executes the command with an analog qualifier. For example, in detail view 700-1, a first digital ink stroke 702 defines a command, in this case a "<" symbol inserted between lines of text indicates that the command is to change the line spacing of the text. In detail view 700-2, a second digital ink stroke 704 executes the command with an analog qualifier. The analog qualifier gives real-time feedback—that is, during the second digital ink stroke, the analog qualifier provides a preview of the analog (qualified) result of the command, which provides additional control by making the command more expressive or precise.

Returning to the detail view 700-2, the second digital ink stroke 704 is a vertical line that controls the line spacing. As the second digital ink stroke 704 moves in a direction shown by an arrow 706, the paragraph line spacing increases. In detail view 700-3, the second digital ink stroke 704 has extended even farther in the direction of the arrow 706 and the line spacing has correspondingly increased beyond what is shown in detail view 700-2. While not shown in FIG. 7, if the second digital ink stroke 704 were to move in a direction opposite of the direction of the arrow 706, the line spacing would decrease.

Another example of a command that can be executed with an analog qualifier is applying an undo/redo command In this example (not shown in FIG. 7), a first digital ink stroke, such as a "U" shaped digital ink stroke, defines an "undo" command A second digital ink stroke, such as a line moving from one leg of the "U" shape to the left on the display, qualifies the command by undoing previous strokes as the line moves left, until the line stops and the stylus is lifted. Other examples include blurring an image or adjusting a shape (or other property) of a digital ink stroke in order to improve consistency or legibility (e.g., for handwritten text).

Throughout FIGS. 5-7, the example multi-stroke gestures described are shown as being made using two digital ink strokes and with the proximity technique described above in FIG. 2. In other implementations, however, the example multi-stroke gestures could include more than two digital ink strokes and could be made using the intersection or chronological immediacy techniques described in FIGS. 3 and 4, respectively.

Additionally, as described above in FIGS. 2-7, the action input module 102 determines that a digital ink stroke and a prior-received digital ink stroke represent a multi-stroke gesture associated with an action input based on a relationship between two or more digital ink strokes. Determining that the digital ink stroke and the prior-received digital ink stroke represent a multi-stroke gesture may also include comparing an initial gesture determination with a set of action inputs associated with an application (e.g., the application 108).

For example, different applications or contexts of an application (e.g., a reading mode and an annotation mode within a single application) may offer the same or different commands and features. Thus, commands like "save" and "delete" may be available in both a note-taking application and a drawing application. The note-taking application, however, may include text-related commands that are not offered by the drawing application, and the drawing application may offer graphics-centric features and commands that are not available on the note-taking application. While the initial gesture determination may be the determination based on the relationship between the two or more digital ink strokes, the action input module 102 may also compare the initial gesture determination with the particular set of possible action inputs associated with the application that is running.

This comparison improves the accuracy of the determination because the determination is made from a reduced set of possible action inputs (what is available from the application) rather than from all possible action inputs available in every application. For example, a particular multi-stroke gesture may be associated with a "blur" command in a drawing application and an "italicize" command in a note-taking application. By using the comparison, the action input module 102 can more quickly and accurately determine whether the digital ink strokes are truly a multi-stroke gesture associated with an action input or merely additional content input.

The available set of commands, and the specific interpretation of each command, may be based on metadata associated with the source content and any currently selected digital ink within the source content. For example, if the source content is a set of notes, the topic of a set of selected notes (e.g., selected by a first digital ink stroke) can be considered by the system when interpreting the smart ink gestures. Specific multi-stroke gestures may be turned on/off based on context or the interpretation of a particular multi-stroke gesture may be replaced with a different one based on context.

Example Methods

With the structure of the example system 100 detailed, the discussion turns to techniques for enabling or using the multi-stroke smart ink gesture language in accordance with one or more aspects. These techniques can be implemented using the previously described apparatuses and example configurations. In portions of the following discussion reference may be made to the example system 100 of FIGS. 1-7, reference to which is made only by way of example. The techniques are not limited to performance by one entity or multiple entities operating on one device. These techniques include methods illustrated in FIGS. 8, 9A, and 9B, which may be used in conjunction with other methods, in whole or in part, whether performed by the same entity, separate entities, or any combination thereof.

FIG. 8 illustrates an example method 800 enabling or using the multi-stroke smart ink gesture language in accordance with one or more aspects. This method is shown as a set of blocks that specify operations performed but are not necessarily limited to the order or combinations shown for performing the operations by the respective blocks.

At 802, a digital ink stroke made through a stylus is received through a display that is capable of receiving input from the stylus (e.g., the display 110 of FIG. 1). The stylus can be a passive or active stylus, such as the stylus 112 of FIG. 1. The digital ink stroke is received over a digital ink user interface associated with an application. For example, the digital ink user interface may be the digital ink user interface 114 of FIG. 1. The digital ink user interface can receive the digital ink stroke and present, in real time, a visual representation of the digital ink stroke. The visual representation of the digital ink stroke is a free-form line matching a free-form movement of an active point of the stylus. The application may be any of a variety of applications that can interpret the digital ink stroke as content input.

Content input, as described above, is input in which the visual representation of the digital ink stroke, produced by the movement of the stylus, is the input (e.g., text or a drawing). An action input, in contrast, is not content. As described above, an action input is an input that results in performance of an action such as a command, a selection of an operation or visual entity, or an adjustment to a property or setting.

As noted, the digital ink user interface may be implemented in an operating system (e.g., the OS 106 of FIG. 1), the application, or as a separate module such as a standalone cloud-based module or a subscription add-on service. In some cases, the digital ink user interface is provided by the separate module (e.g., the action input module 102 of FIG. 1), which performs the steps of this method. In other cases, the digital ink user interface may be provided by the operating system working in conjunction with the application, and the operating system can perform the steps of this method, including presenting the visual representation of the digital ink stroke.

At 804, based on a proximity to, intersection with, or chronological immediacy to a prior-received digital ink stroke currently presented in or over the digital ink user interface, it is determined that the digital ink stroke and the prior-received digital ink stroke represent a multi-stroke gesture associated with an action input. For example, the digital ink stroke and the prior-received digital ink stroke may be interpreted to represent a multi-stroke gesture using any of the techniques described above with reference to FIGS. 2-4, including techniques based on a second proximity to, second intersection with, or second chronological immediacy to a second prior-received digital ink stroke.

Optionally, at 806, the initial gesture determination of step 804 is compared with a set of action inputs associated with an application. As noted, different applications and different contexts or modes within an application may offer different commands and features. Thus, the initial gesture determination (e.g., based on the relationship between two or more digital ink strokes) may be compared with the particular set of possible action inputs associated with the application or mode that is running. This comparison makes the determination more robust and accurate because the determination is made from a reduced set of possible action inputs rather than from all possible action inputs available in all applications.

At 808, the action input is provided to the application, which receives and reacts to the action input by performing the associated action. The action input with which the multi-stroke gesture is associated may be any of the action inputs described above with reference to FIGS. 5-7, including to define a selection and then define a command to be performed on the selection, to define a property and then adjust the property in either one or two dimensions, and to define a command and then execute the command with an analog qualifier.

FIG. 9A illustrates another example method 900 enabling or using the multi-stroke smart ink gesture language in accordance with one or more aspects. This method is shown as a set of blocks that specify operations performed but are not necessarily limited to the order or combinations shown for performing the operations by the respective blocks.

At 902, a first digital ink stroke made through a stylus is received through a display that is capable of receiving input from the stylus (e.g., the display 110 of FIG. 1). The stylus can be a passive or active stylus, such as the stylus 112 of FIG. 1. The first digital ink stroke is received over a digital ink user interface associated with an application. For example, the digital ink user interface may be the digital ink user interface 114 of FIG. 1.

At 904, a first visual representation of the first digital ink stroke is presented over the digital ink user interface, in real time. The first visual representation of the first digital ink stroke is a free-form line matching a free-form movement of an active point of the stylus.

At 906, while the first visual representation of the first digital ink stroke is visually maintained, a second digital ink stroke, made through the stylus, is received through the display and over the digital ink user interface.

FIG. 9B illustrates additional steps of the example method 900 illustrated in FIG. 9A.

At 908, a second visual representation of the second digital ink stroke is presented over the digital ink user interface and in real time, while visually maintaining the first visual representation. As noted, the digital ink user interface may be implemented in an operating system (e.g., the OS 106 of FIG. 1), the application, or as a separate module such as a standalone cloud-based module or a subscription add-on service. In some implementations, the digital ink user interface is provided by the separate module (e.g., the action input module 102 of FIG. 1), which performs the steps of this method. In other implementations, the digital ink user interface may be provided by the operating system working in conjunction with the application, and the operating system can perform the steps of this method, including presenting the first and second visual representations over the digital ink user interface.

At 910, it is determined that the first and second digital ink strokes represent a multi-stroke gesture associated with an action input. The determination is based on a location of the first digital ink stroke represented by the first visual representation or on a relationship between the first digital ink stroke and the second digital ink stroke.

Content input, as described above, is input in which the visual representation of the digital ink stroke, produced by the movement of the stylus, is the input (e.g., text or a drawing). An action input, in contrast, is not content. As described above, an action input is an input that results in performance of an action such as a command, a selection of an operation or visual entity, or an adjustment to a property or setting.

In some implementations, the application may not be capable of receiving a digital ink stroke as a content input. In other implementations, the application may be capable of receiving a digital ink stroke as content input. Thus, the application may receive the first digital ink stroke of a multi-stroke gesture as content input. In these cases, in response to the determination that the first and second digital ink strokes represent a multi-stroke gesture associated with an action input, the application does not receive or recognize the first digital ink stroke as content input.

For example, consider the example technique 200-2 of FIG. 2, which illustrates a first digital ink stroke 208 that selects a portion of displayed text. In an application that is capable of receiving a digital ink stroke as content input, the first digital ink stroke 208 may be interpreted as a content input such as a notation to review the selected portion later. Once the second digital ink stroke 206 is received, however, it can be determined that the digital ink strokes 206 and 208 represent a multi-stroke gesture associated with an action input. In response to this determination, the application does not interpret the digital ink stroke 208 as a content input and instead receives and performs the action input. As noted the digital ink strokes of the multi-stroke gesture are displayed in transient digital ink and are dismissed once the action input is performed.

The application may include a command user interface and the determination that the first and second digital ink strokes represent a multi-stroke gesture associated with an action input may be based on the location of the first digital ink stroke. A command user interface is a user interface that is primarily intended to receive commands and instructions for using and navigating the application. For example, a command user interface may be a navigation menu, a start-up screen, a drop-down menu, or a toolbar. In these cases, it may be determined that the first digital ink stroke, based on the location, selects a visual control or image presented within the command user interface. For example, a command user interface in a drawing program may provide a drawing space and a toolbar with a list of properties that can be adjusted in multiple ways. When a first digital ink stroke is, for example, a circle around one of the properties on the toolbar, it can be determined that the first digital ink stroke is a selection of the property to be adjusted.

The determination that the first and second digital ink strokes represent a multi-stroke gesture associated with an action input may also include comparing the second digital ink stroke to a set of action inputs associated with an application. As noted, the first digital ink stroke can be determined to be the selection of a control or image presented within the command user interface. The initial gesture determination, based on the location of the first digital ink stroke, can be completed by comparing the second digital ink stroke with the particular set of possible action inputs associated with the property that was selected via the first digital ink stroke (the selected visual control or image). This comparison makes the determination more robust and accurate because the determination is made from a reduced set of possible action inputs (e.g., the adjustments available to the selected property) rather than from all possible adjustments for every available control.

In other implementations, the determination that the first and second digital ink strokes represent a multi-stroke gesture associated with an action input may be based on both the first and second digital ink strokes by determining that the first and second digital ink strokes are in proximity to each other, intersect each other, or are chronologically immediate. For example, the first and second digital ink strokes may be determined to represent a multi-stroke gesture using any of the techniques described above with reference to FIGS. 2-4. Further, the determination may include techniques in which the multi-stroke gesture includes a third digital ink stroke (that is received prior to the first digital ink stroke) and the determination is additionally based on a second proximity to, second intersection with, or second chronological immediacy of the third digital ink stroke with the first digital ink stroke. Thus, a multi-stroke gesture may be constructed with three digital ink strokes. As described above, proximity, intersection, or immediacy (or combinations of proximity, intersection, and immediacy) between the first and second digital ink strokes and between the second and third digital ink strokes are used to determine whether the three digital ink strokes are a multi-stroke gesture.

In cases in which the initial gesture determination is based on both the first and second digital ink strokes, the determination may be compared with a set of action inputs associated with the application or a particular mode or context of the application. As noted, different applications may offer different commands and features, including different commands and features within different modes or contexts of the application. Thus, the initial gesture determination may be compared with the particular set of possible action inputs associated with the application (or the context or mode of the application) that is running.

At 912, the action input is provided to the application, which receives and reacts to the action input by performing the associated action. The application may perform the command from the command user interface as described above, in which the determination that the first and second digital ink strokes represent a multi-stroke gesture associated with an action input is based on the location of the first digital ink stroke. For example, a command related to a navigation menu, a start-up screen, a drop-down menu, or a toolbar.

In implementations where the determination that the first and second digital ink strokes represent a multi-stroke gesture associated with an action input is based on both the first and second digital ink strokes, the performed action input may be any of the action inputs described above with reference to FIGS. 5-7, including to define a selection, then define a command to be performed on the selection, to define a property, then adjust the property in either one or two dimensions, and to define a command, then execute the command with an analog qualifier.

Example Computing System

Figure 10:
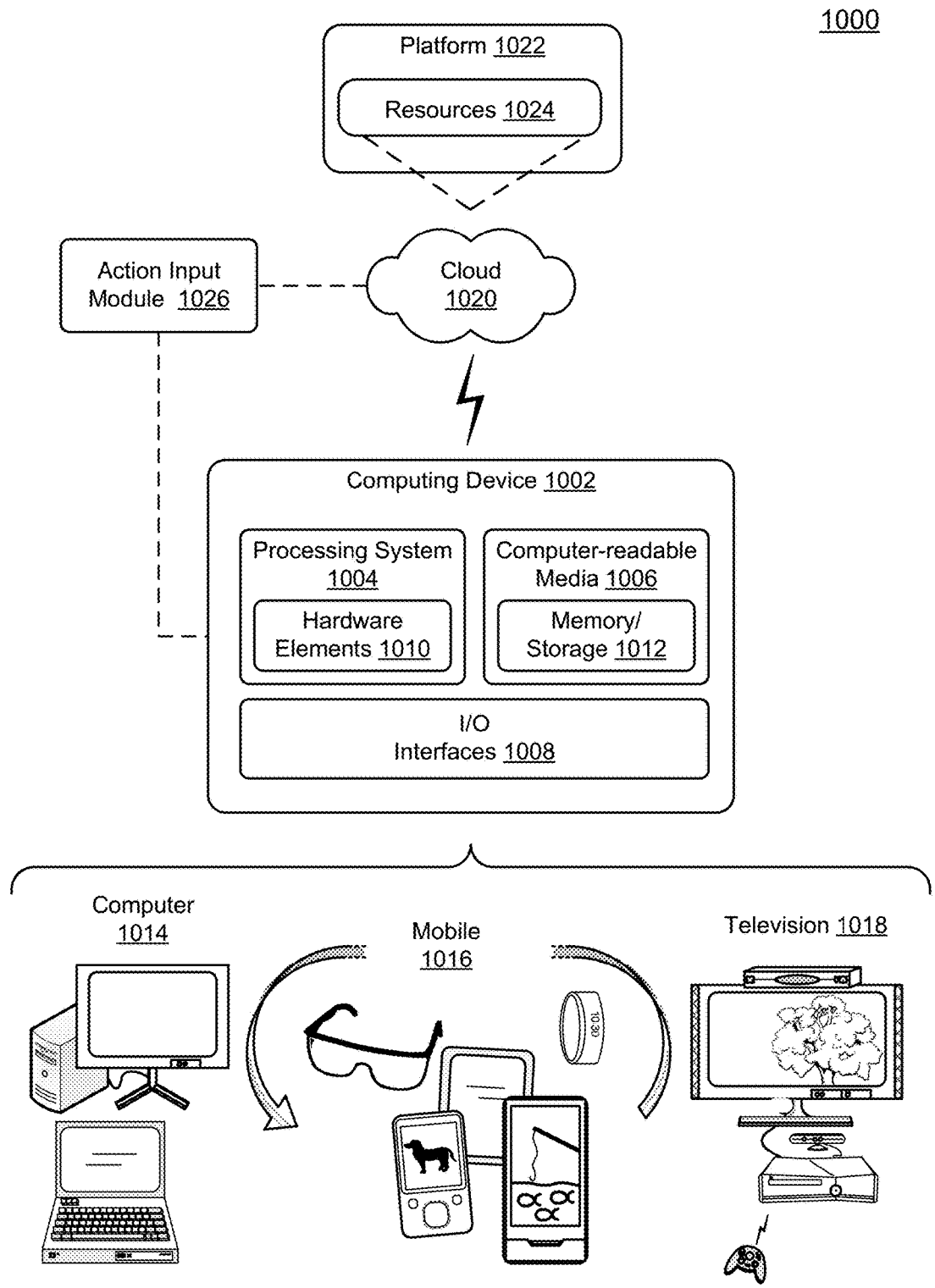
FIG. 10 illustrates various components of an example computing device that can be implemented as any type of client, server, and/or computing device as described with reference to the previous FIGS. 1-9B to implement the multi-stroke smart ink gesture language.

FIG. 10 illustrates an example computing system generally at 1000 that includes an example computing device 1002 that is representative of one or more systems and/or devices that may implement the multi-stroke smart ink gesture language described herein with reference to FIGS. 1-9B. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O Interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Resistive RAM (ReRAM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

The one or more input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch, including from an active or passive stylus), a camera (e.g., which may employ visible or non-visible wavelengths such as infrared frequencies to detect movement that does not involve touch as gestures), and so forth. Examples of output devices include a display device (e.g., a monitor or projector) with touch functionality as described above and that is capable of displaying digital ink, speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 1010 and computer-readable media 1006 are representative of instructions, modules, programmable device logic and/or fixed device logic implemented in a hardware form that may be employed to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules as a module that is executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example computing system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example computing system 1000, multiple devices are interconnected through a central computing device. The central computing device may be local to the multiple devices or may be located remotely from the multiple devices. In one or more implementations, the central computing device may be a cloud of one or more server computers that are connected to the multiple devices through a network, the Internet, or other data communication link.

In one or more implementations, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more implementations, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1014, mobile 1016, and television 1018 uses. Each of these configurations includes devices that may have generally different constructs and capabilities, and thus the computing device 1002 may be configured according to one or more of the different device classes. For instance, the computing device 1002 may be implemented as the computer 1014 class of a device that includes a personal computer, desktop computer, a multi-screen computer, laptop computer, netbook, and so on.

The computing device 1002 may also be implemented as the mobile 1016 class of device that includes mobile devices, such as a mobile phone, portable music player, portable gaming device, a tablet computer, a multi-screen computer, and so on. The computing device 1002 may also be implemented as the television 1018 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. This functionality may also be implemented all or in part through use of a distributed system, such as over a "cloud" 1020 via a platform 1022 as described below.

The cloud 1020 includes and/or is representative of a platform 1022 for resources 1024. The platform 1022 abstracts underlying functionality of hardware (e.g., servers) and software resources of the cloud 1020. The resources 1024 may include applications and/or data that can be utilized while computer processing is executed on servers that are remote from the computing device 1002. Resources 1024 can also include services provided over the Internet and/or through a subscriber network, such as a cellular or Wi-Fi network.

The platform 1022 may abstract resources and functions to connect the computing device 1002 with other computing devices. The platform 1022 may also serve to abstract scaling of resources to provide a corresponding level of scale to encountered demand for the resources 1024 that are implemented via the platform 1022. Accordingly, in an interconnected device implementation, the functionality described herein may be distributed throughout the system 1000. For example, the functionality may be implemented in part on the computing device 1002 as well as via the platform 1022 that abstracts the functionality of the cloud 1020.

The example computing system 1000 also includes an action input module 1026. The action input module 1026 may be implemented via the cloud 1020 or via the computing device 1002. The action input module 1026 provides various functionality for interacting with the computing device 1002 with a stylus (e.g., a passive stylus or an active stylus), such as for enabling the computing device 1002 to receive input from the stylus as action input. The action input module 1026 can be, for example, the action input module 102 of FIG. 1.

Conclusion

Although implementations of techniques and apparatuses enabling a multi-stroke smart ink gesture language have been described in language specific to features and/or methods, it is to be understood that the subject of the appended claims is not necessarily limited to the specific features or methods described. Rather, the specific features and methods are disclosed as implementations of the multi-stroke smart ink gesture language.

In the discussions herein, various methods and apparatuses are described. It is to be appreciated and understood that each of the methods and apparatuses described herein can be used on its own or in connection with one or more other methods and/or apparatuses described herein. Further aspects of the techniques discussed herein relate to one or more of the following:

A system comprising: an operating system (OS); an application; and an action input module implemented at least partially in hardware and configured to: provide, via the OS or the application, a digital ink user interface that is associated with the application and that can receive a digital ink stroke made through a stylus, the digital ink stroke: received through a display that is capable of receiving input from the stylus; and received over the digital ink user interface, the digital ink user interface configured to receive the digital ink stroke and present, in real time, a visual representation of the digital ink stroke, the application configured to interpret the digital ink stroke as content input; determine, based on a proximity to, intersection with, or chronological immediacy to a prior-received digital ink stroke currently presented in or over the digital ink user interface, that the digital ink stroke and the prior-received digital ink stroke represent a multi-stroke gesture associated with an action input; and provide the action input to the application effective to cause the application to receive and react to the action input.

Alternatively or in addition to any of the above described systems, any one or combination of: wherein the visual representation of the digital ink stroke is a free-form line matching a free-form movement of an active point of the stylus; wherein: the digital ink user interface is presented by the OS, working in conjunction with the application, and the OS: presents the visual representation over the digital ink user interface; determines that the digital ink stroke and the prior-received digital ink stroke represent the multi-stroke gesture associated with the action input; and provides the action input to the application; wherein the stylus is an active pen configured to engage in active communication with the display; wherein the content input is text or a drawing; wherein determining that the digital ink stroke and the prior-received digital ink stroke represent the multi-stroke gesture is based on the proximity of the digital ink stroke to the prior-received digital ink stroke; wherein determining that the digital ink stroke and the prior-received digital ink stroke represent the multi-stroke gesture is based on the intersection of the digital ink stroke with a visual representation of the prior-received digital ink stroke; wherein determining that the digital ink stroke and the prior-received digital ink stroke represent the multi-stroke gesture is based on the chronological immediacy of the digital ink stroke to reception of the prior-received digital ink stroke; wherein determining that the digital ink stroke and the prior-received digital ink stroke represent the multi-stroke gesture is further based on a second proximity to, second intersection with, or second chronological immediacy of a second prior-received digital ink stroke, the second prior-received digital ink stroke received prior to the prior-received digital ink stroke; wherein determining that the digital ink stroke and the prior-received digital ink stroke represent the multi-stroke gesture further comprises comparing an initial gesture determination with a set of action inputs associated with the application.

A method, comprising: receiving a digital ink stroke made through a stylus, the digital ink stroke: received through a display that is capable of receiving input from the stylus; and received over a digital ink user interface associated with an application, the digital ink user interface configured to receive the digital ink stroke and present, in real time, a visual representation of the digital ink stroke, the application configured to interpret the digital ink stroke as content input; determining, based on a proximity to, intersection with, or chronological immediacy to a prior-received digital ink stroke currently presented in or over the digital ink user interface, that the digital ink stroke and the prior-received digital ink stroke represent a multi-stroke gesture associated with an action input; and providing the action input to the application effective to cause the application to receive and react to the action input.

Alternatively or in addition to any of the above described methods, any one or combination of: wherein the digital ink user interface is provided by an operating system working in conjunction with the application, the operating system performing the method and presenting the visual representation over the digital ink user interface; wherein the action input is determined to be: to define a selection, then define an action to be performed on the selection; to define a property, then adjust the property in either one or two dimensions; or to define a command, then execute the command with an analog qualifier; wherein determining that the digital ink stroke and the prior-received digital ink stroke represent the multi-stroke gesture is based on the proximity of the digital ink stroke to the prior-received digital ink stroke, the intersection of the digital ink stroke with a visual representation of the prior-received digital ink stroke, or the chronological immediacy of the digital ink stroke to reception of the prior-received digital ink stroke; wherein determining that the digital ink stroke and the prior-received digital ink stroke represent the multi-stroke gesture is further based on a second proximity to, second intersection with, or second chronological immediacy of a second prior-received digital ink stroke, the second prior-received digital ink stroke received prior to the prior-received digital ink stroke; wherein determining that the digital ink stroke and the prior-received digital ink stroke represent the multi-stroke gesture further comprises comparing an initial gesture determination with a set of action inputs associated with the application.

A method, comprising: receiving a first digital ink stroke made through a stylus, the first digital ink stroke: received through a display that is capable of receiving input from the stylus; and received over a digital ink user interface associated with an application; presenting, over the digital ink user interface and in real time, a first visual representation of the first digital ink stroke; receiving, while the first visual representation of the first digital ink stroke is visually maintained, a second digital ink stroke made through the stylus and received over the digital ink user interface; presenting, over the digital ink user interface and in real time, a second visual representation of the second digital ink stroke while visually maintaining the first visual representation; determining, based on a location of the first digital ink stroke represented by the first visual representation or a relationship between the first digital ink stroke and the second digital ink stroke, that the first and second digital ink strokes represent a multi-stroke gesture associated with an action input; and providing the action input to the application effective to cause the application to receive and react to the action input.

Alternatively or in addition to any of the above described methods, any one or combination of: wherein the application includes a command user interface and determining that the first and second digital ink strokes represent the multi-stroke gesture associated with the action input is based on the location of the first digital ink stroke; and further comprising determining that the first digital ink stroke, based on the location, selects a visual control or image presented within the command user interface; wherein determining that the first and second digital ink strokes represent the multi-stroke gesture associated with the action input is based on both the first and second digital ink strokes, and wherein the determining determines that the first and second digital ink strokes are in proximity to each other, intersect each other, or are chronologically immediate; wherein the application is capable of receiving the first digital ink stroke as a content input and, responsive to determining that the first and second digital ink strokes represent the multi-stroke gesture associated with the action input, not recognizing the first digital ink stroke as the content input.

What is claimed is:

1. A system, comprising:
an operating system (OS);
an application; and
an action input module implemented at least partially in hardware and configured to:
provide, via the OS or the application, a digital ink user interface that is associated with the application and that can receive a digital ink stroke made through a stylus, the digital ink stroke:
received through a display that is capable of receiving input from the stylus; and
received over the digital ink user interface, the digital ink user interface configured to receive the digital ink stroke and present, in real time, a visual representation of the digital ink stroke, the application configured to interpret the digital ink stroke as content input;
determine, based on a detected proximity to a prior-received digital ink stroke and a chronological immediacy time duration associated with a receipt of the digital ink stroke relative to the prior-received digital ink stroke currently presented in or over the digital ink user interface, that the digital ink stroke and the prior-received digital ink stroke represent a multi-stroke gesture associated with an action input; and
provide the action input to the application effective to cause the application to receive and react to the action input.

2. The system of claim 1, wherein the visual representation of the digital ink stroke is a free-form line matching a free-form movement of an active point of the stylus.

3. The system of claim 1, wherein:
the digital ink user interface is presented by the OS, working in conjunction with the application, and the OS:
presents the visual representation over the digital ink user interface;
determines that the digital ink stroke and the prior-received digital ink stroke represent the multi-stroke gesture associated with the action input; and
provides the action input to the application.

4. The system of claim 1, wherein the detected proximity is based on detection of an intersection of the digital ink stroke with a visual representation of the prior-received digital ink stroke.

5. The system of claim 1, wherein determining that the digital ink stroke and the prior-received digital ink stroke represent the multi-stroke gesture is based on the chronological immediacy time duration indicating a threshold amount of time that has elapsed between the receipt of the digital ink stroke and a receipt of the prior-received digital ink stroke.

6. The system of claim 1, wherein determining that the digital ink stroke and the prior-received digital ink stroke represent the multi-stroke gesture is further based on one or more of: a second proximity to, a second intersection with, and a second chronological immediacy time duration of a second prior-received digital ink stroke, and wherein the second prior-received digital ink stroke is received prior to the prior-received digital ink stroke.

7. The system of claim 1, wherein determining that the digital ink stroke and the prior-received digital ink stroke represent the multi-stroke gesture further comprises comparing an initial gesture determination with a set of action inputs associated with the application.

8. The system of claim 1, wherein a determination that the digital ink stroke and the prior-received digital ink stroke represent the multi-stroke gesture further comprises detecting that the digital ink stroke is received in a transient digital ink.

9. The system of claim 8, wherein the action input module is further configured to dismiss the transient digital ink, from the digital ink user interface, based on a recognition of the action input.

10. The system of claim 1, wherein the action input module is further configured to detect a mode of execution for the application, and wherein the action input is selected based a determination that the multi-stroke gesture is received in the detected mode of execution for the application.

11. A method, comprising:
receiving a digital ink stroke made through a stylus, the digital ink stroke:
  received through a display that is capable of receiving input from the stylus; and
  received over a digital ink user interface associated with an application, the digital ink user interface configured to receive the digital ink stroke and present, in real time, a visual representation of the digital ink stroke, the application configured to interpret the digital ink stroke as content input;
determining, based on a detected proximity to a prior-received digital ink stroke and a chronological immediacy time duration associated with a receipt of the digital ink stroke relative to the prior-received digital ink stroke currently presented in or over the digital ink user interface, that the digital ink stroke and the prior-received digital ink stroke represent a multi-stroke gesture associated with an action input; and
providing the action input to the application effective to cause the application to receive and react to the action input.

12. The method of claim 11, wherein the digital ink user interface is provided by an operating system working in conjunction with the application, the operating system performing the method and presenting the visual representation over the digital ink user interface.

13. The method of claim 11, wherein the action input is determined to be: to define a selection, then define an action to be performed on the selection; to define a property, then adjust the property in either one or two dimensions; or to define a command, then execute the command with an analog qualifier.

14. The method of claim 11, wherein determining that the digital ink stroke and the prior-received digital ink stroke represent the multi-stroke gesture further comprises comparing an initial gesture determination with a set of action inputs associated with the application.

15. The method of claim 11, wherein a determination that the digital ink stroke and the prior-received digital ink stroke represent the multi-stroke gesture further comprises detecting that the digital ink stroke is received in a transient digital ink, and wherein the method further comprising: dismissing the transient digital ink, from the digital ink user interface, based on a recognition of the action input.

16. The method of claim 11, further comprising: detecting a mode of execution for the application, and wherein the action input is selected based a determination that the multi-stroke gesture is received in the detected mode of execution for the application.

17. A method, comprising:
receiving a first digital ink stroke made through a stylus, the first digital ink stroke:
  received through a display that is capable of receiving input from the stylus; and
  received over a digital ink user interface associated with an application;
presenting, over the digital ink user interface and in real time, a first visual representation of the first digital ink stroke;
receiving, while the first visual representation of the first digital ink stroke is visually maintained, a second digital ink stroke made through the stylus and received over the digital ink user interface;
presenting, over the digital ink user interface and in real time, a second visual representation of the second digital ink stroke while visually maintaining the first visual representation;
determining, based on a detected proximity of the first digital ink stroke and the second digital ink stroke and a chronological immediacy time duration associated with a receipt of the second digital ink stroke relative to the first digital ink stroke, that the first digital ink stroke and the second digital ink stroke represents a multi-stroke gesture associated with an action input; and
providing the action input to the application effective to cause the application to receive and react to the action input.

18. The method of claim 17, wherein the application includes a command user interface, and wherein the action input is selected based on a location of the first digital ink stroke; and the method further comprising; determining that the first digital ink stroke, based on the location, selects a visual control or image presented within the command user interface.

19. The method of claim 17, wherein a determination that the first digital ink stroke and the second digital ink stroke represent the multi-stroke gesture further comprises detecting that the first digital ink stroke is received in a transient digital ink, and wherein the method further comprising: dismissing the transient digital ink, from the digital ink user interface, based on a recognition of the action input.

20. The method of claim 17, further comprising: detecting a mode of execution for the application, and wherein the action input is selected based a determination that the multi-stroke gesture is received in the detected mode of execution for the application.

* * * * *